Patented June 10, 1930

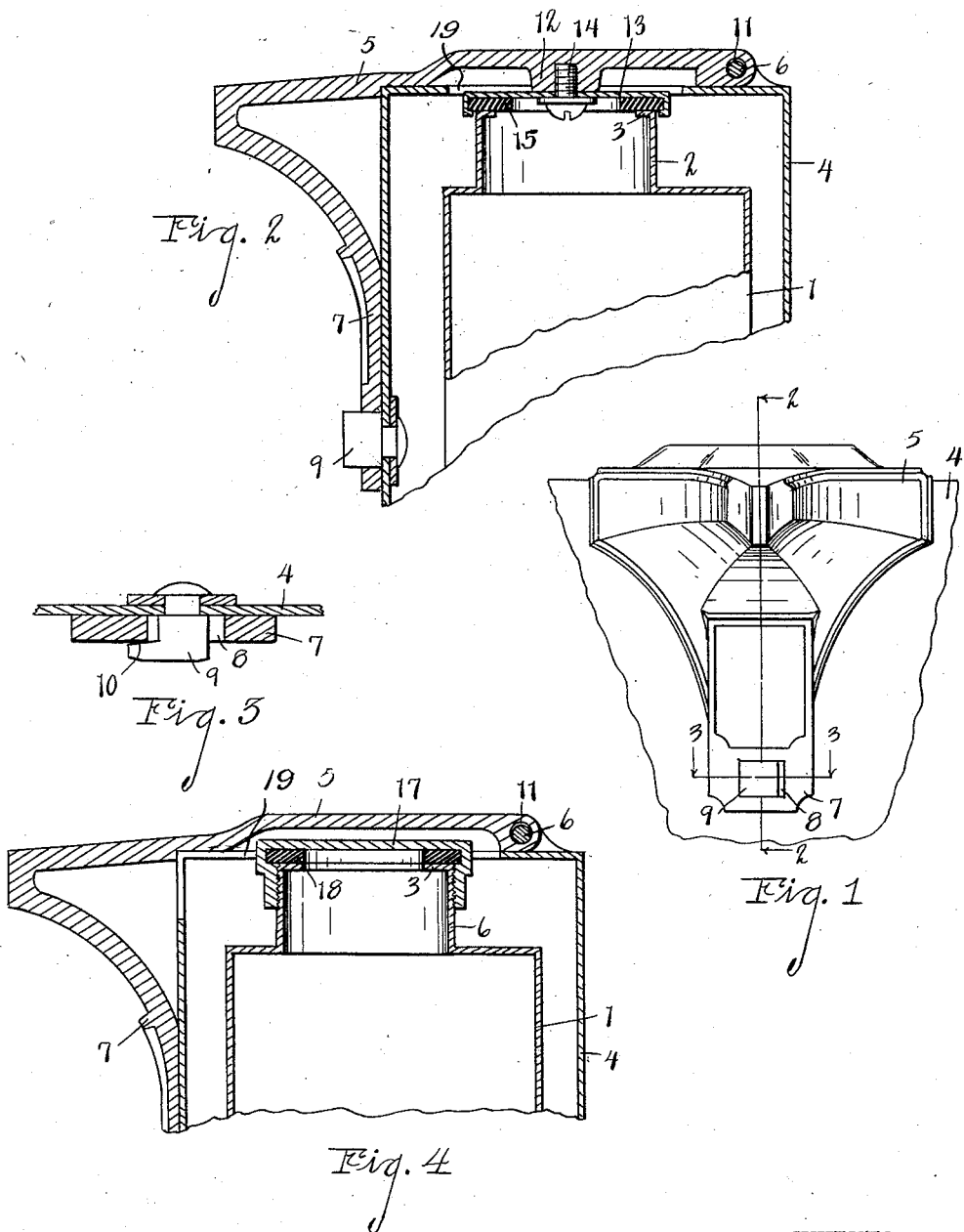

1,763,184

UNITED STATES PATENT OFFICE

FREDERICK C. RUPPEL, OF GRAND RAPIDS, MICHIGAN, ASSIGNOR TO W. B. JARVIS COMPANY, OF GRAND RAPIDS, MICHIGAN

RADIATOR FOR MOTOR VEHICLES

Application filed February 27, 1928. Serial No. 257,438.

The main object of this invention is to provide an improved radiator for automobiles and the like with filling opening and closure therefor which lies close to the radiator shell.

A further object is to provide a structure of this class which is very economical in its parts, easy to manipulate and at the same time attractive in appearance.

Objects pertaining to details and economies of my invention will definitely appear from the description to follow. The invention is defined in the claims.

A structure embodying the features of my invention is clearly illustrated in the accompanying drawing, in which:

Fig. 1 is a fragmentary front elevation of a radiator embodying my improvements.

Fig. 2 is a detail vertical section on line 2—2 of Fig. 1.

Fig. 3 is a detail section on line 3—3 of Fig. 1.

Fig. 4 is a detail vertical section of a modified form or embodiment of my invention.

Referring to the drawing, 1 represents the radiator and 2 the filler neck thereof having an inturned flange 3 at its upper end providing a flat valve face. 4 represents the radiator shell which has an opening 19 therein alined with the radiator neck to afford access thereto.

I provide a closure for the radiator neck which in the embodiment shown in Figs. 1 and 2 consists of an angle member 5 which is pivoted at 6 to the radiator shell at the rear of the opening so that its vertical arm or portion 7 overlaps the front of the radiator shell when in closed position. This flange portion 7 has an opening 8 therein adapted to receive the hook-like keeper 9, the inner face 10 of which is cammed or inclined. The pivot hole 11 in the closure is of such dimensions as to permit a limited lateral movement of the closure member; that is, it is a loose fit on the pivot so that the closure member may be engaged with the keeper with a lateral movement. Owing to the cam face of the keeper the closure is drawn and retained firmly in closed position.

In the embodiment shown in Fig. 2 the closure member is provided with an internal stud 12 on which the disk or plate-like valve member 13 is mounted by means of the screw 14. This valve plate carries the gasket or valve facing 15 coacting with the seat of the radiator neck. As both are flat they do not interfere with the lateral movement and are not injured by the lateral movement of the closure member as it is engaged with the keeper.

In the embodiment shown in Fig. 4 the radiator neck 16 is externally threaded to receive the cap 17. A gasket 18 is provided for the cap. This embodiment, however, requires separate manipulation of the cap.

My improvements are well adapted for embodiment in various designs and the embodiment illustrated is provided with a surface 19 adapted to receive the name plate or emblem of the vehicle. I have not attempted to illustrate or describe various modifications and adaptations which are possible as it is believed the disclosure made will enable those skilled in the art to embody or adapt my improvements as may be desired.

Having thus described my invention what I claim as new and desire to secure by Letters Patent is:

1. The combination with a radiator shell having an opening therein, a radiator disposed within the shell and having a filling opening mounted with a flat-faced valve seat, an angular closure member pivotally mounted on said shell at the rear of said opening so that its vertical arm overlaps the front of the radiator shell when closed, said front arm having an opening therein, said hinge connection for said closure member being such as to permit limited lateral movement thereof, a valve mounted on said closure member to coact with said valve seat, said valve having a flat face permitting lateral sliding movement thereof on said valve seat, and a keeper on the front of said shell positioned to project through said opening in said closure member and with which the closure member may be engaged by a lateral movement, said keeper having a cam face coacting with said closure member.

2. The combination with a radiator shell having an opening therein, a radiator disposed within the shell and having a filling opening, an angular closure member pivotally mounted on said shell at the rear of said opening so that its vertical arm overlaps the front of the radiator shell when closed, said front arm having an opening therein, said hinge connection for said closure member being such as to permit limited lateral movement thereof, and a keeper on the front of said shell positioned to project through said opening in said closure member and with which the closure member may be engaged by a lateral movement, said keeper having a cam face coacting with said closure member.

3. The combination with a radiator shell having an opening therein, a radiator disposed within said shell and having a filling opening, a closure member pivotally mounted on said shell at the rear of said opening and provided with a front portion adapted to overlap the front of the shell when closed, said closure member being mounted to permit limited lateral movement, a keeper on said shell with which said closure member may be engaged and disengaged by such lateral movement, and a closure for said filling opening coacting therewith to permit such lateral movement.

4. The combination with a radiator shell having an opening therein, a radiator disposed within said shell and having a filling opening therein alined with said opening in said shell, a closure for said opening in said shell pivotally mounted on the shell to permit limited lateral movement thereof, a keeper on said shell with which said closure member may be engaged and disengaged by such lateral movement, and a closure for said radiator filling opening carried by said closure member.

In witness whereof I have hereunto set my hand.

FREDERICK C. RUPPEL.